(12) United States Patent
Zhang et al.

(10) Patent No.: US 9,848,212 B2
(45) Date of Patent: Dec. 19, 2017

(54) MULTI-VIEW VIDEO STREAMING WITH FAST AND SMOOTH VIEW SWITCH

(71) Applicant: Futurewei Technologies, Inc., Plano, TX (US)

(72) Inventors: Dong-Qing Zhang, Branchburg, NJ (US); Hongbing Li, Skillman, NJ (US); Miao Zhao, Santa Clara, CA (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 32 days.

(21) Appl. No.: 14/796,522

(22) Filed: Jul. 10, 2015

(65) Prior Publication Data
US 2017/0013283 A1 Jan. 12, 2017

(51) Int. Cl.
*H04N 7/173* (2011.01)
*H04N 21/218* (2011.01)
(Continued)

(52) U.S. Cl.
CPC ... *H04N 21/21805* (2013.01); *H04L 65/4084* (2013.01); *H04L 65/4092* (2013.01);
(Continued)

(58) Field of Classification Search
None
See application file for complete search history.

(56) References Cited

U.S. PATENT DOCUMENTS

| 6,349,115 B1 * | 2/2002 | Tahara | H04N 5/4401 348/718 |
| 6,349,118 B1 * | 2/2002 | Caso | H04L 5/06 375/295 |

(Continued)

FOREIGN PATENT DOCUMENTS

| CN | 102055967 | 5/2011 |
| CN | 102905150 | 1/2013 |

OTHER PUBLICATIONS

Cheung, Gene, "Interactive Streaming of Stored Multiview Video Using Redundant Frame Structures", IEEE Transactions on Image Processing, vol. 20, No. 3, Mar. 2011, (Mar. 2011), 744-761.
(Continued)

*Primary Examiner* — James R Sheleheda
(74) *Attorney, Agent, or Firm* — Schwegman Lundberg & Woessner, P.A.

(57) ABSTRACT

A video server comprises memory to store video content obtained from multiple camera views; one or more streaming components configured to stream video content to a client application; and one or more frame feeder components. A frame feeder component is configured to access first video content corresponding to a first camera view and provide the first video content to a streaming component; access, in response to a request received at the video server to stream second video content corresponding to a second camera view, intermediate video content corresponding to one or more camera views intermediate to the first and second camera views; and access the second video content, and provide the intermediate video content and the second intermediate video to the streaming component.

19 Claims, 7 Drawing Sheets

(51) Int. Cl.
　　　*H04N 21/231*　　(2011.01)
　　　*H04L 29/06*　　　(2006.01)
　　　*H04N 21/232*　　(2011.01)
　　　*H04N 21/234*　　(2011.01)
　　　*H04N 21/6547*　 (2011.01)

(52) U.S. Cl.
　　　CPC ......... *H04L 65/602* (2013.01); *H04N 21/232* (2013.01); *H04N 21/234* (2013.01); *H04N 21/23109* (2013.01); *H04N 21/6547* (2013.01)

(56) References Cited

U.S. PATENT DOCUMENTS

| | | | | |
|---|---|---|---|---|
| 7,548,962 | B2* | 6/2009 | Weber | G06Q 30/02 709/219 |
| 8,489,749 | B2* | 7/2013 | Horn | H04L 12/185 709/220 |
| 8,923,344 | B2* | 12/2014 | Begeja | H04N 21/26275 370/507 |
| 2002/0188943 | A1* | 12/2002 | Freeman | G03C 1/26 725/38 |
| 2003/0023974 | A1* | 1/2003 | Dagtas | H04N 7/17318 725/47 |
| 2010/0026788 | A1 | 2/2010 | Ishikawa et al. | |
| 2011/0052155 | A1* | 3/2011 | Desmarais | H04N 5/76 386/290 |
| 2011/0164614 | A1* | 7/2011 | Begeja | H04N 21/26275 370/390 |
| 2012/0296452 | A1* | 11/2012 | Baier | G06Q 10/06 700/83 |
| 2013/0268986 | A1* | 10/2013 | Venkatachalam | H04N 21/2365 725/109 |
| 2013/0321575 | A1* | 12/2013 | Kirk | G06T 15/04 348/43 |
| 2014/0368495 | A1* | 12/2014 | Wei | H04N 13/0048 345/419 |
| 2015/0015660 | A1* | 1/2015 | Weber | G03B 37/04 348/14.03 |
| 2015/0033278 | A1* | 1/2015 | Amento | H04N 7/17318 725/116 |
| 2015/0248722 | A1* | 9/2015 | Malak | G06Q 30/0641 705/27.2 |
| 2016/0162244 | A1* | 6/2016 | Christmas | G06T 15/00 345/1.3 |

OTHER PUBLICATIONS

Lou, Jian-Guang et al., "A Real-Time Interactive Multi-View Video System", Proceedings of ACM Multimedia Conference 2005, (2005), 161-170.

"International Application No. PCT/CN2016/086574, International Search Report and Written Opinion dated Sep. 14, 2016", (dated Sep. 14, 2016), 12 pgs.

* cited by examiner

MULTI-VIEW VIDEO STREAMING WITH FAST AND SMOOTH VIEW SWITCH

BACKGROUND

Video streaming systems stream video-related data over a communication network for applications such as video conferencing, and on-demand viewing of media and sporting events. A multi-camera video streaming system uses an array of cameras to capture multiple video streams, and the video viewers can use client software to receive the video streams and selectively change the view angles to watch the video content taken from different viewpoints. During a view change, it may be desirable for the viewer to see view sweeping effects (e.g., a "freeze" time effect or a "Dolly" effect), so that they can experience smooth view change.

However, there can be issues associated with the view switch of the camera array streaming system. One issue is the smoothness of the view change. Typically, when the viewer chooses to switch from one view to another, the images captured by the cameras between the two specified camera views also need to sequentially delivered to the client application side of the system so that the viewer can see the view-sweeping effect, and therefore experience smooth view change. However, for a Video-on-Demand streaming system, the captured videos are compressed (e.g. typically by temporal Group-of-Picture (GOP) based compression schemes, such as H.264) and saved as compressed files. If the client viewer needs to produce the view-sweeping effect, they need to download all the corresponding video segments from different views, extract corresponding frames and concatenate them for playback. This is only feasible if the network is very fast, and has low delay. Another issue is the initial delay of the view change, which is defined as the duration between the time when the user chooses to change the view and the time when the user actually sees the view change or the start of the view-sweeping effect. The initial delay could significantly impact user experience because it could result in freezing frames on the screen.

SUMMARY

A device includes memory to store video content obtained from multiple camera views; one or more streaming components configured to stream video content to a client application; and one or more frame feeder components. A frame feeder component is configured to access first video content corresponding to a first camera view and provide the first video content to a streaming component; access, in response to a request received at the video server to stream second video content corresponding to a second camera view, intermediate video content corresponding to one or more camera views intermediate to the first and second camera views; and access the second video content, and provide the intermediate video content and the second intermediate video to the streaming component.

A method includes streaming first video content from a server to a client application using a network link, wherein the server stores video content obtained from multiple camera views and the streamed first video content corresponds to a first camera view; receiving a request at the server from the client application to stream second video content corresponding to a second camera view; and generating a video special effect at the client application by streaming video content corresponding to one or more camera views intermediate to the first and second camera views via the network link when the video content streamed is changed from the first video content to the second video content in response to the received request.

This summary is intended to provide an overview of subject matter of the present patent application. It is not intended to provide an exclusive or exhaustive explanation of the invention. The detailed description is included to provide further information about the present patent application.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
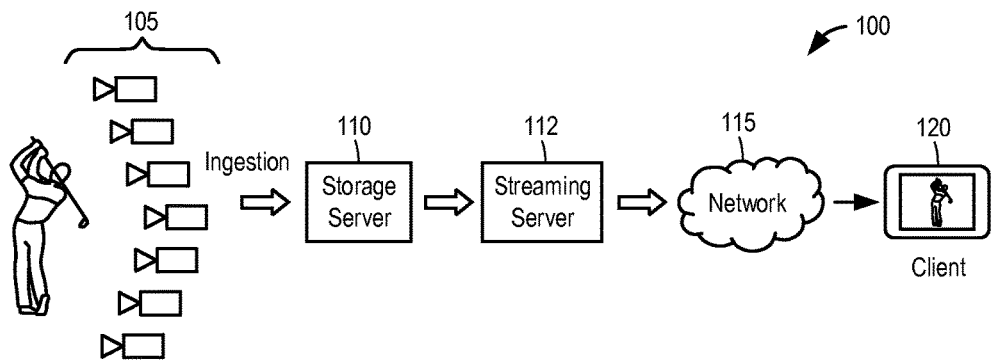
FIG. 1 is a block diagram of an example of a video streaming system.

FIG. 1 is a block diagram of an embodiment of a video streaming system. The system 100 includes an array of cameras 105 and one or more servers that send video over a network 115 to a client application or client 120. The camera array 105 captures video at different viewing angles of the desired scene or event. The captured videos will be input to the storage server 110 where they may be stored as uncompressed raw video data or as compressed video files. The system may include a streaming server 112 for forwarding videos from the storage server and sending the videos to the client 120. In some variations, the streaming server 112 and the storage server 110 are included in the same physical server.

At the client side, the user may use a multi-view video player to interact with the streaming server 112 and can select to receive the videos at different camera view angles. The client side device may include a Graphical User Interface (GUI). The GUI may show the cameras in the camera array, and enable the user to select a camera in the GUI to switch to a different camera view angle. During the view switch, the client could be used to play back certain video special effects (e.g. freeze time or view sweeping) so that the viewer can experience a smoother view change. The videos received by the client are usually compressed videos (e.g., compressed using H.264 or MPEG-1/2), and the videos can be delivered to the client with different transport protocols (e.g., real time transport protocol (RTP), hypertext transport protocol (HTTP) etc.).

Previous approaches to video streaming systems relied on devices on the client side of the system to produce the video special effects desired by a user. For example, the client 120 may include playback logic and sends requests for video segments for the video special effects. However, the amount of video data needed to produce the video special effects can be large. With a client side solution, the client needs to download all the segments in real time to smoothly produce the desired effect. If sufficient network bandwidth is not available, the user may experience delays in producing the selected video effect. In another situation, the client may not request a special video effect, but may want to directly switch to view i+N at time t, where i+N represents a view N video frames away from current view frame i. The client needs to download the video segment for view i+N, discard all the video frames before time t, and play back the remaining video frames. This could result in initial delay, because the client has to decompress the video frames sequential in order to reach the desired frame at time t due to the nature of the predictive compression scheme. This is because most of the current predictive video coding schemes (e.g., MPEG-1/2 or H.264) are unable to randomly access the video frames created with a Group-of-Picture structure.

In another example, the video system includes specialized equipment to produce side video streams specifically for producing video sweeping special effects. However, when the user requests the view change, the client 120 first downloads the special effect video stream, and then plays back the special effect stream while downloading the video streams corresponding to which the view the user intends to switch. The client-side player will continue to play back the video streams for the target view after the special effect video playback is completed. This solution is complicated by the fact that the side stream videos have to be created, which increases the storage requirements and also requires additional encoders dedicated for side stream creation for real-time live streaming applications. The result is that even for a small scale application, the system may require a large number of video encoders if the number of views is large. A better approach is to produce the selected video effects on the server-side of a video streaming system.

Figure 2:
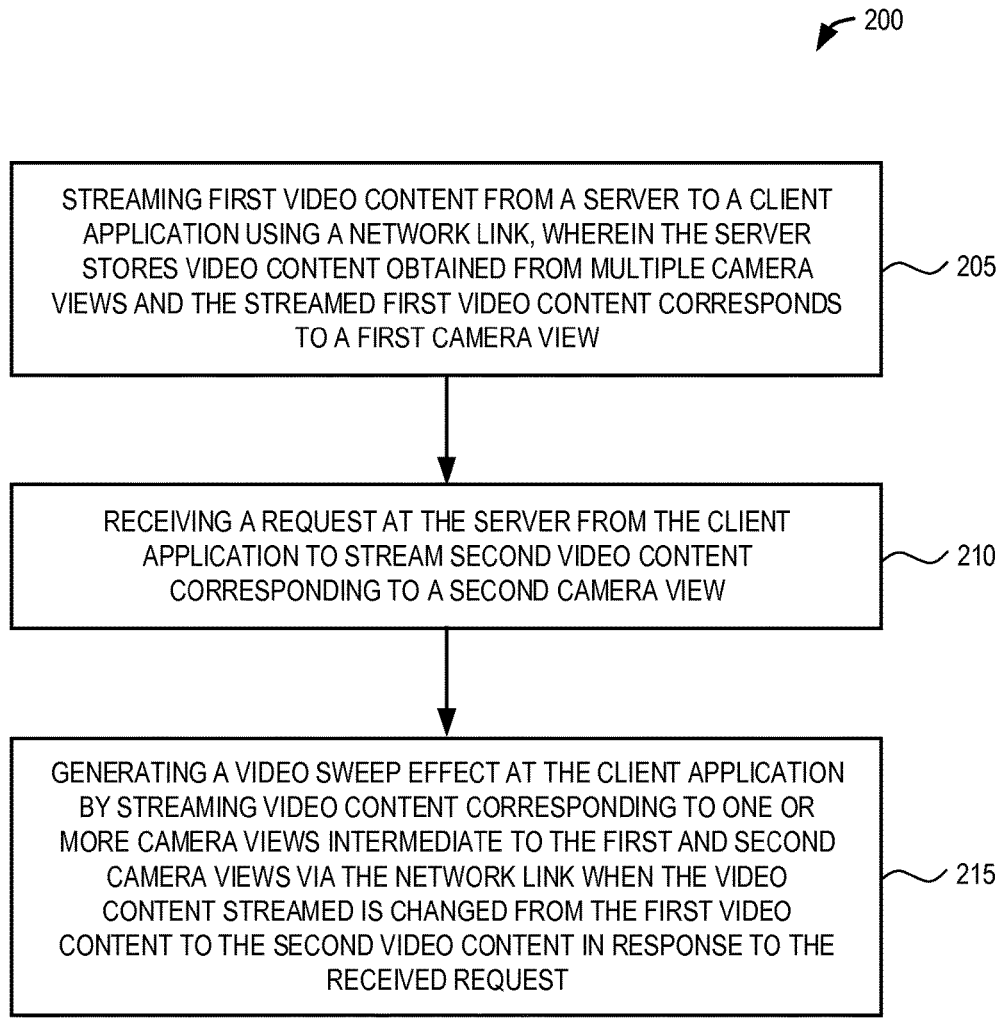
FIG. 2 is a flow diagram of an example of a method of operating a video streaming system.

FIG. 2 shows a flow diagram of an embodiment of a method 200 of operating a video streaming system. At 205, first video content is streamed from a server to a client application using a network link. The server stores video content obtained from multiple camera views and the streamed first video content corresponds to a first camera view from the multiple cameras. At 210, a request is received at the server from the client application to stream second video content corresponding to a second camera view.

At 215, a video special effect is generated at the client application by streaming video content corresponding to one or more camera views intermediate to the first and second camera views via the network link when the video content streamed is changed from the first video content to the second video content in response to the received request. A server side switching scheme switches the raw video frames at the server side before encoding, and therefore solves the random access problem and the video special effect creation problem of client-side approaches.

Figure 3:
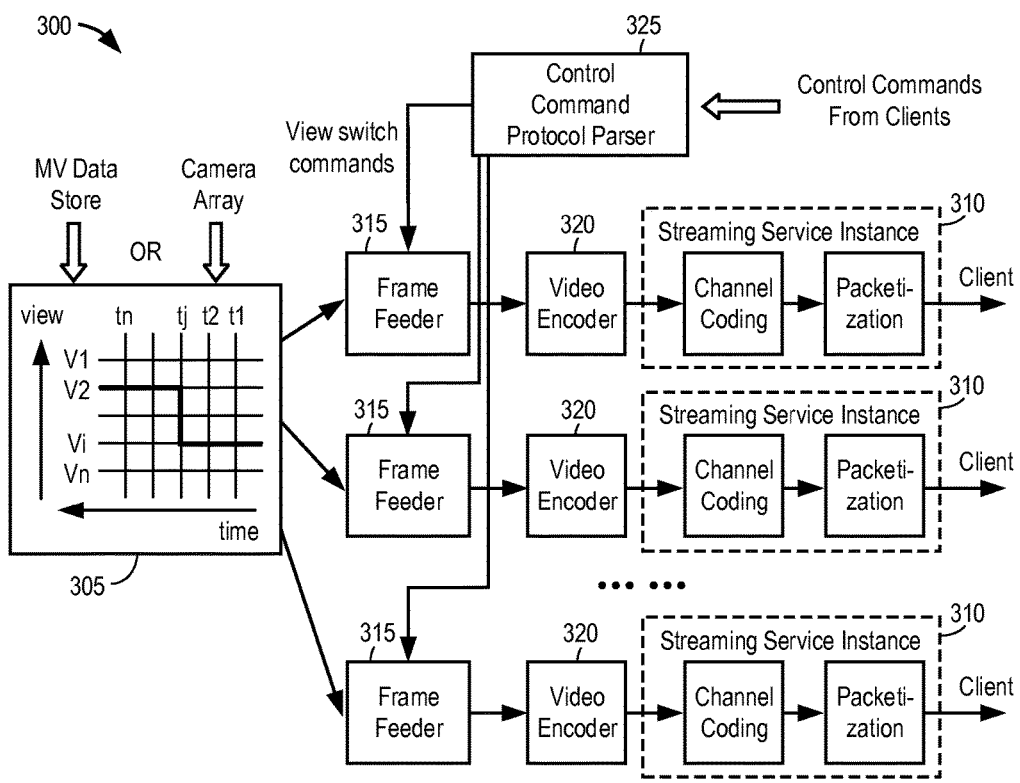
FIG. 3 is a block diagram of an example of portions of a video streaming system.

FIG. 3 shows a block diagram of an embodiment of portions of a video streaming system. The system 300 includes memory 305, one or more streaming components 310, and one or more frame feeder components 315. A component may include software, firmware, or hardware, or any combination of software, firmware, and hardware to perform the functions described. In some embodiments, the memory 305, the streaming components 310, and the frame feeder components 315 are included in a video server that combines the functions of a storage server and streaming server.

The memory 305 stores video content obtained from multiple camera views. The video content may be obtained directly from a camera array or may be previously saved video files containing multi-view video content. The streaming service components stream video content to one or more clients. In certain embodiments, the streaming component is a streaming service instance executing on a video server or a streaming server. Each streaming service instance may be running in a separate process or thread. The video content is streamed over a network link (e.g., via the internet).

The frame feeder components access first video content corresponding to a first camera view and provide the first video content to a streaming service component. In response to a request received from a client to stream second video content corresponding to a second camera view, a frame feeder accesses from memory the second video content and intermediate video content corresponding to one or more camera views intermediate to the first and second camera views. The video frames retrieved by the frame feeder component produce the video special effect requested by the client. The video frames may be provided to a video encoder 320 and an encoded video stream is sent to the client. The requested video effect is produced at the client by the client playing the received video stream created on the server-side of the video streaming system.

The video system may include a command parser component 325 that receives requests from the client applications to receive video content. The command parser component 325 sends view switch commands to the frame feeder components 315 that determine which video frames are retrieved by a feeder frame component and the order in which the video frames are retrieved. The retrieved content and order of retrieval can produce the video effects requested by the client.

According to some embodiments, the memory 305 is arranged as a two dimensional first-in-first-out (FIFO) buffer. For instance, one FIFO buffer row (or column) may correspond to one camera view of the multiple camera views of the camera array. A position in a FIFO buffer corresponds to a video frame of a time step associated with a video frame sampling rate. The frame feeder may access a first FIFO buffer row for the first video content, access a second FIFO buffer row for the second video content, and access one or more FIFO buffer rows different from first and second FIFO buffers for the intermediate video content.

In some variations, the memory is arranged as multiple FIFO buffers. One FIFO buffer may correspond to one camera view of the multiple camera views of the camera array. The frame feeder may access a first FIFO buffer for the first video content, access a second FIFO buffer for the second video content, and access one or more FIFO buffers different from first and second FIFO buffers for the intermediate video content.

For example, if a client application requests a switch from view i (corresponding to the view from the $i^{th}$ camera) to view i+K (corresponding to the view from the $(i+K)^{th}$ camera) at time t with a video freeze effect, the frame feeder may receive a command from the command parser that causes the frame feeder to sequentially retrieve the video frames of view i, i+1, i+2, . . . i+K from FIFOs i through K at the position in the FIFOs corresponding to time t. The frame feeder may send the frames to the video encoder for encoding and to the streaming component for streaming the video content to the client.

According to some embodiments, the memory 305 is arranged as a video frame matrix buffer that includes a first matrix dimension corresponding to a specified camera view and a second matrix dimension corresponding to time steps associated with a video frame sampling rate. In response to receiving a command for a first type of video sweep effect, the frame feeder component traverses the video frame matrix buffer to access video content from a first video frame corresponding to the first camera view and a first time step, through one or more video frames of the video frame matrix buffer corresponding to the one or more intermediate camera views, to video frames corresponding to the second camera view.

The memory 305 shown in the example of FIG. 3 is arranged in rows labeled V1, V2 . . . Vi, Vn corresponding to views of cameras 1 through n, and arranged in columns corresponding to time. Each node of the matrix grid represents a video frame. The time range of the horizontal axis is from the current playing moment to a certain time point later. The time dimension may correspond to time steps determined by the video sample rate and the video matric buffer may be updated at each time step. Older video frames corresponding to all the views may be deleted from the video matrix buffer as new sets of video frames are inserted at the end of the video matrix buffer. The video matrix buffer may reside in a shared memory or in external storage. The video frames can be accessed by all of the frame feeder components. The video frames of the video matrix buffer may be received from cameras of the camera array in real-time, or the video frames may be read from video files by decoding the bit streams saved in the video files.

To stream video for camera view i, the frame feeder component traverses the row of the video matrix buffer corresponding to camera view i. For the freeze effect example described previously, the frame feeder component traverses the video frame matrix buffer in the column for time t from the row corresponding to camera view i to the row corresponding to camera view i+K. The frame feeder may then traverse the row for camera view i+K to stream the new video content available for that view angle. FIG. 3 shows a path traversed by the frame feeder starting in row Vi, traversing in the time dimension from column t1 to tj, traversing in the view direction from row Vi to row V2, and then traversing in the time dimension from column tj to column tn.

For other types of effects, the frame feeder component traverses the video matrix buffer in different time/view paths of the video matrix buffer. For example, in the video matrix buffer of FIG. 3, the time forward direction is left to right through the columns. Video played in reverse can be provided by traversing columns from right to left. A video sweep effect from camera i to camera view i+K with time advance and without the freeze effect can be generated by the frame feeder retrieving video frames sequentially in the time direction and the view direction. In the example matrix path shown in FIG. 3, this would result in a path segment having a slope rather than segments that are strictly horizontal or vertical.

In some embodiments, the frame feeder component interpolates one or more video frames of the intermediate video content between the first video content and the second video content. View interpolation can be used obtain a video frame at a new view point using the video frames from the existing viewpoints. With view interpolation a camera view switch may be made to look smoother at the client side. The view interpolation can be realized using one or more of three-dimensional (3D) depth computation, re-projection, and frame interpolation.

Figure 4:
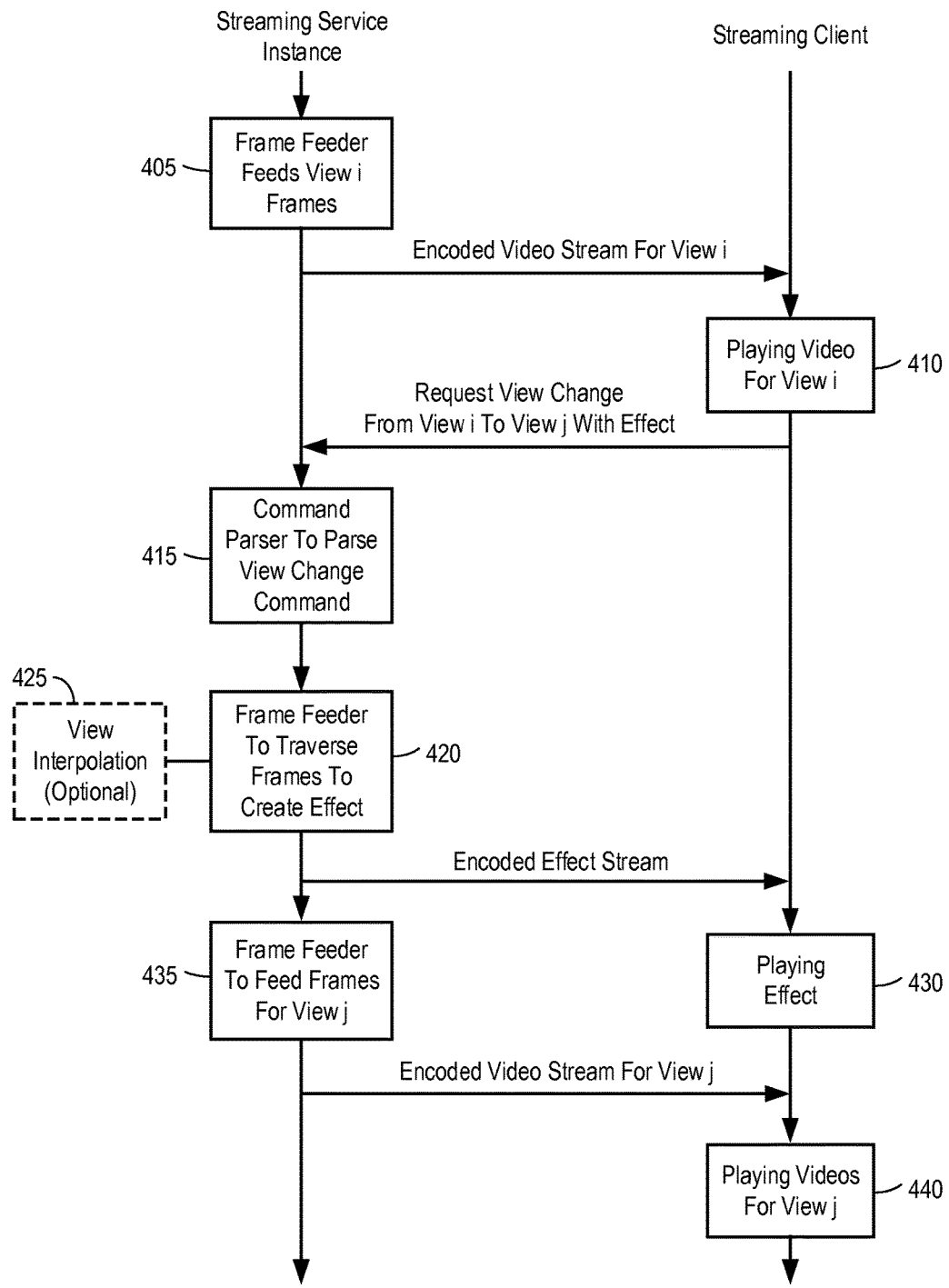
FIG. 4 is an example of a sequence of actions in processing a camera view switch request of a client.

FIG. 4 shows an embodiment of a sequence of actions in processing a camera view switch request from a client. A protocol between the video server and the client is used to transmit information about the camera IDs, the view switch effect type, etc. The function blocks at the client side are intended just for as an illustrative example. In practice, the player at the client side may just continuously play back the video streams from the video server without any session state change.

At 405, the streaming service instance of the video server sends video frames to the client that are fed from the frame feeder component and at 410 the client plays the video frames. The video frames correspond to view i (e.g., a view from camera i) and the client requests a view change from view i to view j. The command parser component accepts and processes the view switch request received from the clients. In some embodiments, the command parser component receives control streams from the client, parses the streams to extract and translates the view switch commands.

At 415, the command parser component delivers the translated control commands to the frame feeder component corresponding to a specified streaming instance for the requested view switch. At 420, the frame feeder component traverses video frames in memory that are used to create a video special effect. View interpolation may be performed at 425 if interpolation is available and if interpolation is needed. An encoded video special effect is sent to the client and at 430 the client plays the video special effect. At 435, the frame feeder component retrieves the frames corresponding to view j and the video frames are sent to the client. At 440, the client plays the video frames corresponding to view j.

Figure 5:
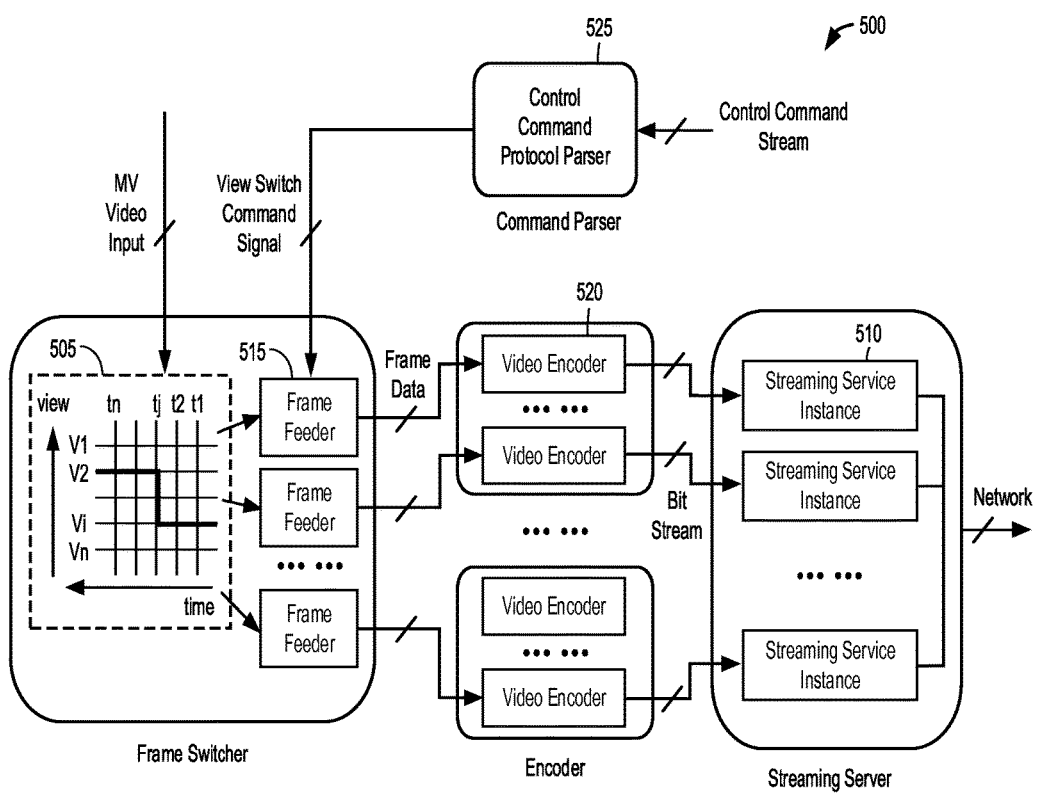
FIG. 5 is a block diagram of portions of another example of a video streaming system.

The embodiment of a video streaming system shown in FIG. 3 is only an example showing how the functional blocks can be arranged in a video streaming system. FIG. 5 shows a block diagram of portions of another embodiment of a video streaming system. The system 500 includes a separate streaming server that includes one or more streaming service instances 510. The video frame matrix buffer 505 and the frame feeder components 515 are included as a unit (e.g., a storage server) separate from the streaming server. The system 500 may include a separate encoding unit that contains one or more standard video encoders 520. The command parser component 525 may be a standalone unit or may be included in the storage server or the streaming server.

Figure 6:
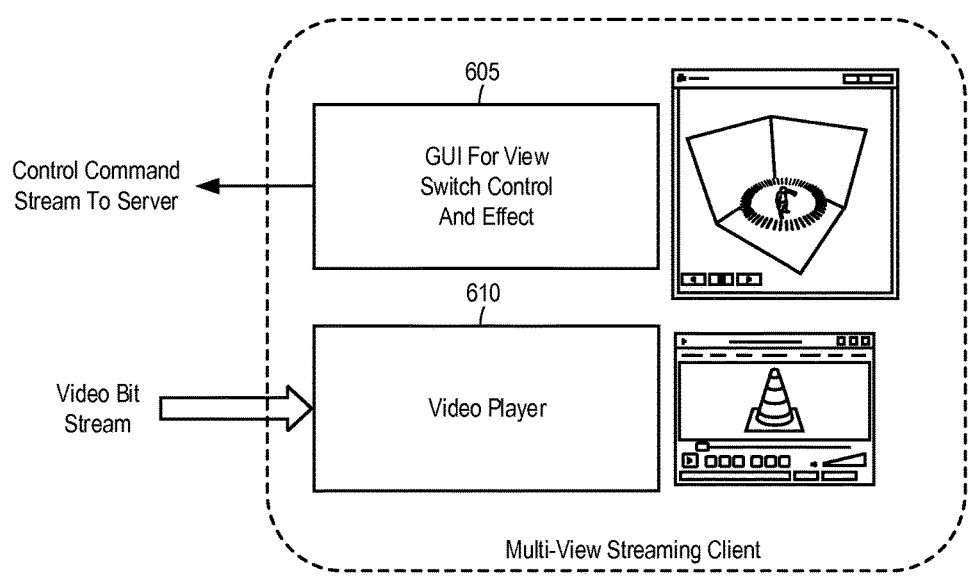
FIG. 6 is a block diagram illustrating portions of an example of a client of a video streaming system.

FIG. 6 illustrates portions of an embodiment of the client. In the example shown the client includes two components; a view switch control GUI and a video player. The switch control GUI 605 shows a camera array. To select a view, the user may select a representation of a camera shown in the switch control GUI 605. To switch camera views, the user selects a different camera. The command parser component receives the request and the requested video content with any requested video effects are streamed to the video player 610 by the video server or streaming server. The video player 610 may be a standard video player (e.g., a video local area network (LAN) client or VLC media player). In certain variations, the switch control GUI 605 is implemented as a plug-in to the video player 610. The client can be backward compatible to existing video players. Existing players without the switch control GUI can also videos streamed from the streaming server, but the user may not be able to switch the camera views with video special effects.

The embodiments described previously herein can be very cost-efficient for small-scale deployment (e.g., video conferencing) where the number of clients is smaller than the number of cameras in the camera array. For example, if the camera array consists of 24 cameras, but there are only 5 clients, then only 5 streaming service instances are needed with 5 encoders. If the number of clients is much larger than the number of cameras, the encoders needed by the system may equal the number of the clients, which will result in much larger total system cost. However, because the client applications only change view occasionally, streaming state replication can be used to extend the described embodiments to the middle to large scale deployments without a substantial increase in cost.

Returning to FIG. 3, the command parser component 325 may receive requests from a plurality of client applications to receive video content. Users typically watch an event from one camera view most of the time. The command parser component initiates streaming of the video content to the client applications as a first video stream of a first streaming service instance of the streaming component. In this way, multiple users can be subscribed to one streaming service instance. If some but not all of the users request a view switch to a different camera view, the command parser may stream the requested video content as a second video stream that includes the requested view and any video content intermediate the original camera view and the requested camera view. The command parser initiates a second streaming service instance to provide the second video stream.

Figure 7:
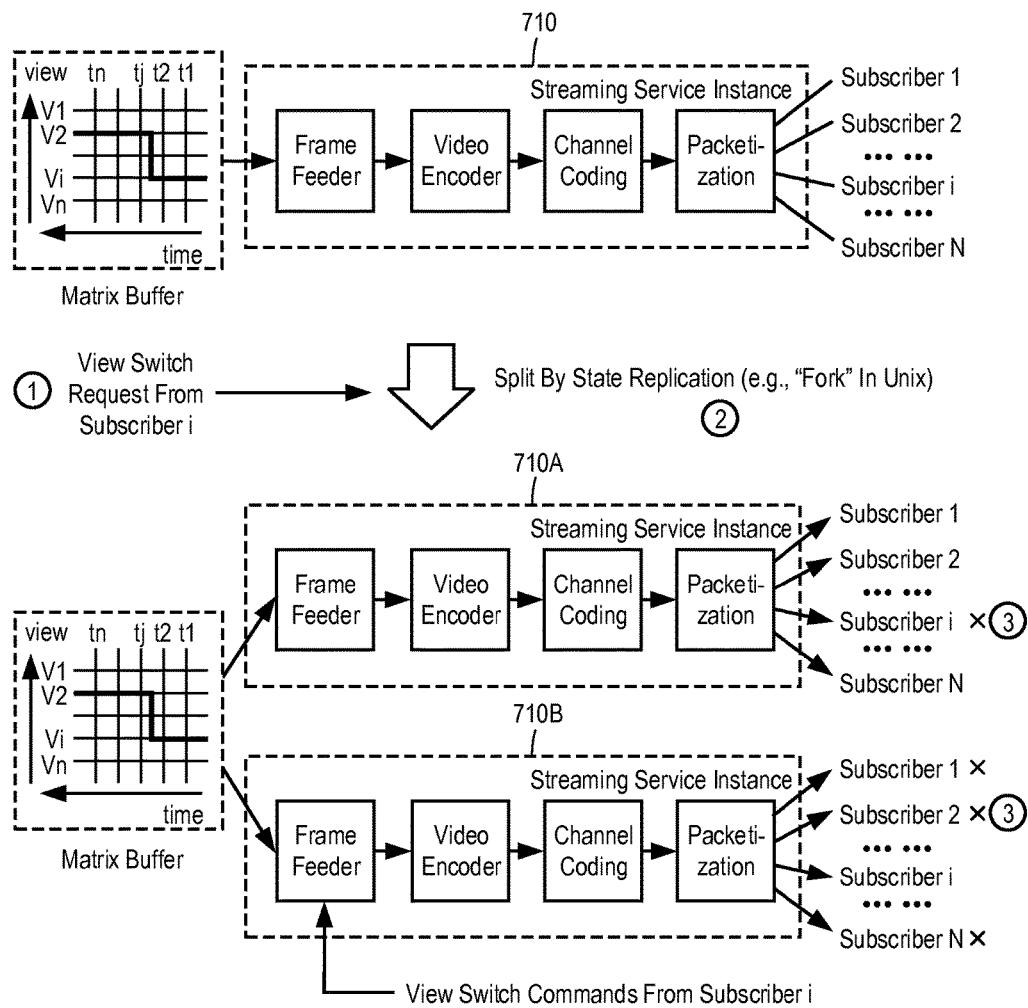
FIG. 7 is a flow diagram illustrating an example of creating the streaming service instances.

FIG. 7 illustrates an embodiment of creating the streaming service instances. The first streaming service instance 710 is split into two instances with exactly the same internal states, including encoder parameters, data, such as reference frames buffers, etc. After splitting, the second streaming service instance 710B will retain the client that requested the view change as the subscriber, but all other subscribers are removed. The first streaming service instance 710A will retain the original subscribers but the client that requested the view change will be removed. The view change commands from the client that requested the view change are only sent to the second streaming service instance 710B. After splitting, the state of the second streaming service instance 710B remains exactly the same as before, and the client will not experience any change of the session state. Therefore, the requesting client receives a smooth playback and view switch.

If the streaming service instances are implemented with software as a process or thread using Unix or Linux types of operating systems, the splitting process can be easily implemented using a function such as the "fork" function in Unix system. The fork function is able to split a process into two processes that are exactly the same with the same memory heap, stack etc. If the streaming service instances are implemented with hardware, the splitting process can be realized by creating a new streaming service instance with a reserved hardware encoder that duplicates the states of the encoder and the first streaming service instance to the second streaming service instance.

As a complement of streaming service replication, streaming service instance merging is provided. Streaming service instance merging merges two instances corresponding to the same camera view into one streaming instance, so that the resources can be released for the future view switch request.

Figure 8:
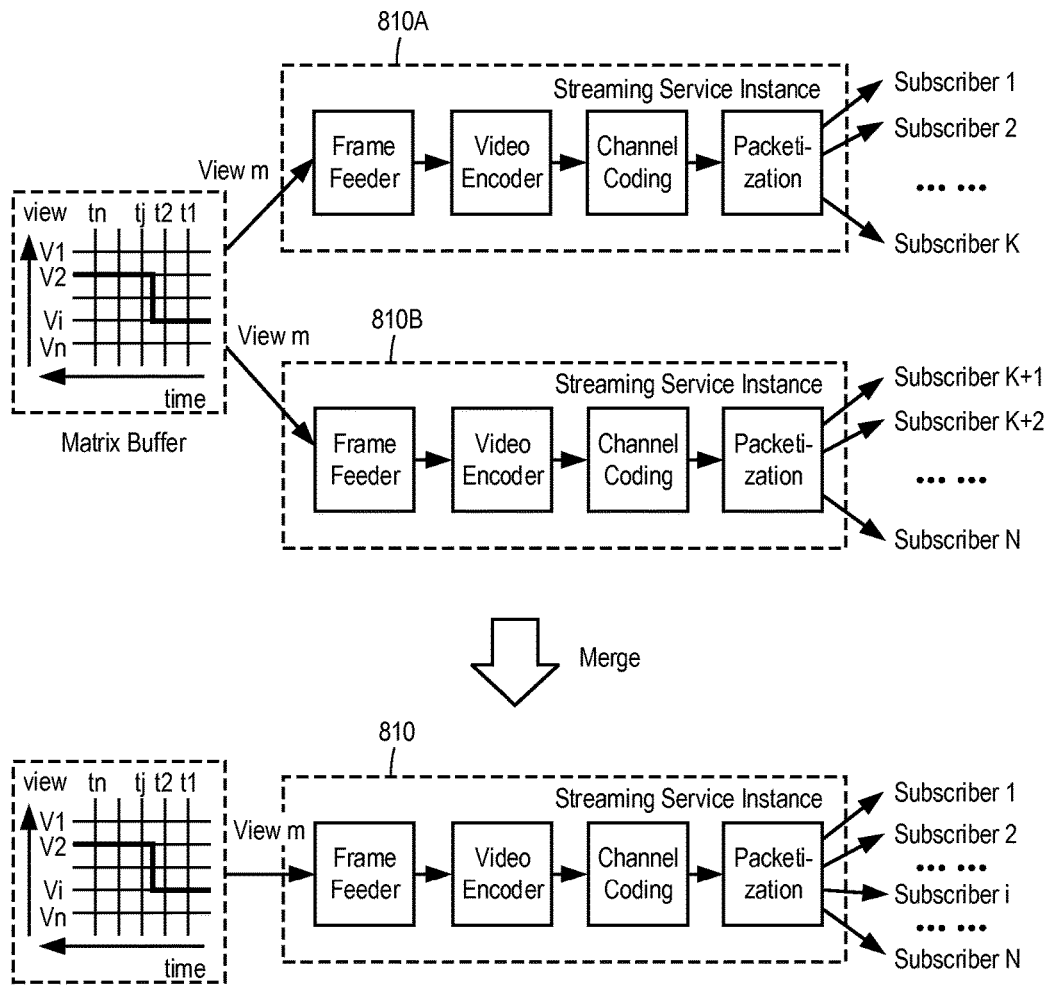
FIG. 8 is a flow diagram illustrating an example of merging streaming service instances.

FIG. 8 illustrates an embodiment of merging streaming service instances. Assume the command parser component has initiated the streaming of video content from the server to a client application as a first video stream using a first streaming service instance 810A, and has also initiated the streaming of video content to a second client application as a second video stream using a second streaming service instance 810B. The first video content corresponds to a first camera view and the second video content corresponds to a second camera view. If the command parser component receives a request from the second client application to stream the first video content, the command parser may generate a command to initiate streaming of the first video stream to both the first client application and the second client application using the one streaming service instance 810.

The embodiments of the server-side switching scheme described herein do not require additional side streams to create the video sweeping effects. Additionally, the number of video encoders needed by the video streaming system scales with the scale of the application and only needs a small number of encoders for a small-scale application, and still only needs a reasonable number of encoders for middle or large applications. The server-side switching scheme also offloads the burden of view switching, control logic and video processing to the server side. Therefore, a client for the system can be easily implemented by adding a view switch GUI plug-in into traditional video players. This is useful if the video streaming system needs to use view interpolation to create intermediate views for a sparse camera system because view interpolation can be a computation intensive task.

ADDITIONAL NOTES AND EXAMPLES

Example 1 includes subject matter (such as a video server) comprising memory to store video content obtained from multiple camera views; a streaming component configured to stream video content to a client application; a frame feeder component configured to: access first video content corresponding to a first camera view and provide the first video content to a streaming component; access, in response to a request received at the video server to stream second video content corresponding to a second camera view, intermediate video content corresponding to one or more camera views intermediate to the first and second camera views; and access the second video content, and provide the intermediate video content and the second intermediate video to the streaming component.

In Example 2, the subject matter of Example 1 optionally includes memory arranged as a video frame matrix buffer, including a first matrix dimension corresponding to a specified camera view and a second matrix dimension corresponding to time steps associated with a video frame sampling rate. The wherein the frame feeder component is optionally configured to, in response to receiving a command for a first type of video special effect, traverse the video frame matrix buffer to access video content from a first video frame corresponding to the first camera view and a first time step, through one or more video frames of the video frame matrix buffer corresponding to the one or more intermediate camera views, to video frames corresponding to the second camera view.

In Example 3, the subject matter of Example 2 optionally includes a video frame matrix buffer arranged as a first-in first-out (FIFO) buffer.

In Example 4, the subject matter of Example 3 optionally includes a frame feeder component is configured to, in response to receiving a command for a second type of video special effect, access the video content by traversing the video frame matrix buffer in both the first camera view dimension and the second time step dimension.

In Example 5, the subject matter of one or both Examples 3 and 4 optionally includes a frame feeder component configured to traverse the video matrix buffer using a matrix path determined according to a video effect requested by the client application.

In Example 6, the subject matter of one or any combination of Examples 1-5 optionally includes a frame feeder component is configured to interpolate one or more video frames of the intermediate video content between the first video content and the second video content.

In Example 7, the subject matter of one or any combination of Examples 1-6 optionally includes a command parser component configured to: receive requests from a plurality of client applications to receive video content; initiate streaming of the first video content to the plurality of client applications as a first video stream of a first streaming service instance of the streaming component; and initiate, in response to a request from less than all of the client applications to stream the second video content, streaming of the intermediate video content and the second video content to the requesting client applications as a second video stream of a second streaming service instance of the streaming component.

In Example 8, the subject matter of one or any combination of Examples 1-7 optionally includes a command parser component configured to: receive requests from a plurality of client applications to receive video content; initiate streaming the first video content from the server to a first client application as a first video stream using a first streaming service instance of the streaming component; initiate streaming third video content to a second client application using a third streaming service instance of the streaming component, wherein the third video content corresponds to a third camera view; and initiate streaming of the first video stream to both the first client application and the second client application using the first streaming service instance in response to receiving a request from the second client application to stream the first video content.

Example 9 can include subject matter (such as a method of operating a video streaming device, a means for performing acts, or a machine-readable medium including instructions that, when performed by the machine, cause the machine to perform acts), or can optionally be combined with the subject matter of one or any combination of Examples 1-8 to include such subject matter, comprising streaming first video content from a server to a client application using a network link, wherein the server stores video content obtained from multiple camera views and the streamed first video content corresponds to a first camera view; receiving a request at the server from the client application to stream second video content corresponding to a second camera view; and generating a video special effect at the client application by streaming video content corresponding to one or more camera views intermediate to the first and second camera views via the network link when the video content streamed is changed from the first video content to the second video content in response to the received request.

In Example 10, the subject matter of Example 9 optionally includes storing video content in a video frame matrix, wherein a first dimension of the video frame matrix corresponds to camera view and a second dimension of the video frame matrix corresponds to a time step associated with a video frame sampling rate. Generating the video special effect optionally includes traversing the video frame matrix to access video content from a first video frame corresponding to the first camera view and a first time step, through one or more video frames of the video frame matrix corresponding to the one or more intermediate camera views, to video frames corresponding to the second camera view.

In Example 11, the subject matter of or both of Examples 9 and 10 optionally includes storing the video content in a first-in first-out (FIFO) buffer, wherein a first dimension of the FIFO corresponds to camera view and a second dimension of the FIFO corresponds to a time step associated with a video frame sampling rate.

In Example 12, the subject matter of Example 11 optionally includes accessing video content by traversing the video frame matrix from the first video frame, through the video frame matrix in both the first camera view dimension and the second time step dimension, to the video frames corresponding to the second camera view.

In Example 13, the subject matter of one or any combination of Examples 9-12 optionally includes receiving the video content from the multiple camera views by the server in real-time.

In Example 14, the subject matter of one or any combination of Examples 9-13 optionally includes streaming the first video content corresponding to the first camera view to a plurality of client applications as a first video stream using a first streaming service instance; receiving a request from less than all of the client applications to stream the second video content corresponding to the second camera view; generating a second streaming service instance in response to the request; and streaming video content, corresponding to the video content of the second camera view and the one or more camera views intermediate to the first and second camera views, as a second video stream to requesting client applications using the second streaming service instance.

In Example 15, the subject matter of one or any combination of Examples 9-14 optionally includes streaming the first video content from the server to a first client application as a first video stream using a first streaming service instance; streaming the third video content to a second client application, wherein the third video content corresponds to a third camera view using a second streaming service instance; and sending the first video stream to both the first client application and the second client application using the first streaming service instance in response to receiving a request at the server from the second client application to stream first video content corresponding to the first camera view.

In Example 16, the subject matter of one or any combination of Examples 9-15 optionally includes interpolating video frames of the one or more camera views intermediate to the first and second camera views between the first video content and the second video content.

Example 17 can include subject matter (such as a video system), or can optionally be combined with the subject matter of or any combination of Examples 1-16 to include such subject matter, comprising a video frame matrix buffer configured to store video content obtained from multiple camera views, wherein the video frame matrix buffer includes a first matrix dimension corresponding to a specified camera view and a second matrix dimension corresponding to time steps associated with a video frame sampling rate; a streaming server including one or more streaming service instances configured to stream video content to one or more client applications; a command parser component configured to receive a request from a client application to change a camera view of video content streamed to the client application; a frame feeder component configured to access video content of the video frame matrix buffer, including to: access first video content of the video matrix buffer corresponding to a first camera view and provide the first video content to a streaming service instance of the streaming server; access, in response to a command from the command parser to stream second video content corresponding to a second camera view, intermediate video content corresponding to one or more camera views intermediate to the first and second camera views; and access the second video content and provide the intermediate video content and the second intermediate video to the streaming service instance.

In Example 18, the subject matter of Example 17 optionally includes a command parser component configured to: initiate streaming of the first video content to a plurality of client applications as a first video stream of a first streaming service instance of the streaming server; receive a request from less than all of the client applications to stream the second video content with a video special effect; and initiate, in response to the request, streaming of the intermediate video content and the second video content to the requesting client applications as a second video stream of a second streaming service instance of the streaming server, wherein the intermediate video content is determined according to the requested video special effect.

In Example 19, the subject matter of one or both of Examples 17 and 18 optionally include a command parser component configured to: receive requests from a plurality of client applications to receive video content; initiate streaming of the first video content from the server to a first client application as a first video stream using a first streaming service instance of the streaming server; initiate streaming third video content to a second client application using a third streaming service instance of the streaming server, wherein the third video content corresponds to a third camera view; and initiate streaming of the first video stream to both the first client application and the second client application using the first streaming service instance in response to receiving a request from the second client application to stream the first video content.

In Example 20, the subject matter of one or any combination of Examples 17-19 optionally includes a storage server that includes the video frame matrix buffer and the frame feeder component.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A video server comprising:
   memory to store video content obtained from multiple camera views, wherein the memory is arranged as a video frame matrix buffer, including a first matrix dimension corresponding to a specified camera view and a second matrix dimension corresponding to time steps associated with a video frame sampling rate;
   a streaming component configured to stream video content to a plurality of client applications as a first streaming service instance in response to first requests from the plurality of client applications;
   a first frame feeder component configured to access first video content corresponding to a first camera view and provide the first video content to the streaming component as the first streaming service instance; and
   a second frame feeder component configured to access, in response to a second request from less than all of the client applications to stream second video content corresponding to a second camera view with a video special effect, intermediate video content by traversing the video frame matrix buffer along a camera view path and a time step path of the video frame matrix buffer to video frames corresponding to the second camera view to generate the video special effect, and provide the intermediate video content as a second streaming service instance to client applications making the second request and maintain the first streaming service instance to the other client applications.

2. The video server of claim 1, wherein the second frame feeder component is configured to, in response to receiving a command for a type of video special effect, traverse the video frame matrix buffer to access video content from a first video frame corresponding to the first camera view and a first time step, through one or more video frames of the video frame matrix buffer in reverse in the second time step matrix dimension corresponding to the one or more intermediate camera views, to video frames corresponding to the second camera view.

3. The video server of claim 1, wherein the memory is arranged as a FIFO buffer.

4. The video server of claim 1, wherein the second frame feeder component is configured to, in response to receiving a command for a type of video special effect, access the video content by traversing the video frame matrix buffer in both the first camera view dimension and the second time step dimension.

5. The video server of claim 1, wherein the second frame feeder component is configured to traverse the video matrix buffer using a matrix path determined according to a video effect requested by the client applications.

6. The video server of claim 1, wherein the second frame feeder component is configured to interpolate one or more video frames of the intermediate video content between the first video content and the second video content.

7. The video server of claim 1, including a command parser component configured to:
    receive the requests from the plurality of client applications to receive video content;
    initiate streaming of the first video content to the plurality of client applications as the first video stream of a first streaming service instance of the streaming component; and
    initiate, in response to the second request from less than all of the client applications to stream the second video content, streaming of the intermediate video content and the second video content to the requesting client applications as the second streaming service instance.

8. The video server of claim 1, including a command parser component configured to:
    receive requests from the plurality of client applications to receive video content;
    initiate streaming the first video content from the server to a first client application as a first video stream using a first streaming service instance of the streaming component;
    initiate streaming third video content to a second client application using a third streaming service instance of the streaming component, wherein the third video content corresponds to a third camera view; and
    initiate streaming of the first video stream to both the first client application and the second client application using the first streaming service instance in response to receiving a request from the second client application to stream the first video content.

9. A method comprising:
    streaming first video content from a server to a plurality of client applications as a first streaming service instance using a network link in response to first requests from the plurality of client applications, wherein the server stores video content obtained from multiple camera views and the streamed first video content corresponds to a first camera view, wherein a plurality of video content is stored in a video frame matrix, wherein a first dimension of the video frame matrix corresponds to camera view and a second dimension of the video frame matrix corresponds to a time step associated with a video frame sampling rate;
    receiving a second request at the server from less than all the client applications to stream second video content corresponding to a second camera view with a video special effect;
    accessing intermediate video content to generate the video special effect by traversing the video frame matrix buffer from a video frame corresponding to the first camera view along a camera view path and a time step path of the video frame matrix buffer to video frames corresponding to the second camera view; and
    providing the intermediate video content as a second streaming service instance to client applications making the second request and providing the first streaming service instance to the other client applications.

10. The method of claim 9, including:
    wherein generating the video special effect includes traversing the video frame matrix through one or more video frames of the video frame matrix in reverse in the second time step matrix dimension corresponding to the one or more intermediate camera views, to video frames corresponding to the second camera view.

11. The method of claim 9, including storing the video content in a first-in first-out (FIFO) buffer, wherein a first dimension of the FIFO corresponds to camera view and a second dimension of the FIFO corresponds to a time step associated with a video frame sampling rate.

12. The method of claim 9, wherein generating the video special effect includes accessing video content by traversing the video frame matrix from the first video frame, through the video frame matrix in both the first camera view dimension and the second time step dimension, to the video frames corresponding to the second camera view.

13. The method of claim 9, including receiving the video content from the multiple camera views by the server in real-time.

14. The method of claim 9, including streaming the first video content from the server to a first client application as a first video stream using a first streaming service instance;
    streaming the third video content to a second client application, wherein the third video content corresponds to a third camera view using a second streaming service instance; and
    sending the first video stream to both the first client application and the second client application using the first streaming service instance in response to receiving a request at the server from the second client application to stream first video content corresponding to the first camera view.

15. The method of claim 9, wherein generating the video special effect includes interpolating video frames of the one or more camera views intermediate to the first and second camera views between the first video content and the second video content.

16. A video system comprising:
    a video frame matrix buffer configured to store video content obtained from multiple camera views, wherein the video frame matrix buffer includes a first matrix dimension corresponding to a specified camera view and a second matrix dimension corresponding to time steps associated with a video frame sampling rate;
    a streaming server including one or more streaming service instances configured to stream video content to one or more client applications;

a frame feeder component configured to access video content of the video frame matrix buffer and provide video content to a streaming service instance;

a command parser configured to: initiate a first streaming service instance to a plurality of client applications in response to requests for video content corresponding to a first camera view; and initiate a second streaming service instance to a subset of the client applications in response to requests for a second camera view with a video special effect from the subset of the client applications, wherein the second streaming service instance includes intermediate video content accessed by the frame feeder component traversing the video frame matrix buffer along a camera view path and a time step path of the video frame matrix buffer to video frames corresponding to the second camera view to generate the video special effect.

17. The video system of claim 16, wherein the command parser component is configured to:

receive a request from less than all of the client applications to stream the second video content with a video special effect; and initiate, in response to the request, streaming of the intermediate video content and the second video content to the requesting client applications as the second video stream of the second streaming service instance of the streaming server, wherein the intermediate video content is determined according to the requested video special effect.

18. The video system of claim 16, wherein the command parser component is configured to:

receive requests from the plurality of client applications to receive video content;

initiate streaming of the first video content from the server to a first client application as a first video stream using a first streaming service instance of the streaming server;

initiate streaming third video content to a second client application using a third streaming service instance of the streaming server, wherein the third video content corresponds to a third camera view; and initiate streaming of the first video stream to both the first client application and the second client application using the first streaming service instance in response to receiving a request from the second client application to stream the first video content.

19. The video system of claim 16, wherein the video frame matrix buffer and the frame feeder component are included in a storage server.

* * * * *